US012755185B2

(12) United States Patent
Miyamoto et al.

(10) Patent No.: US 12,755,185 B2
(45) Date of Patent: Oct. 6, 2026

(54) CONTROL SYSTEM AND QUANTUM COMPUTER CONTROL METHOD

(71) Applicant: Hitachi, Ltd., Tokyo (JP)

(72) Inventors: Atsushi Miyamoto, Tokyo (JP); Chihiro Yoshimura, Tokyo (JP)

(73) Assignee: HITACHI, LTD., Tokyo (JP)

( * ) Notice: Subject to any disclaimer, the term of this patent is extended or adjusted under 35 U.S.C. 154(b) by 826 days.

(21) Appl. No.: 18/112,163

(22) Filed: Feb. 21, 2023

(65) Prior Publication Data

US 2024/0070509 A1 Feb. 29, 2024

(30) Foreign Application Priority Data

Aug. 29, 2022 (JP) ................................ 2022-135822

(51) Int. Cl.

*G06N 10/80* (2022.01)
*G06F 1/26* (2006.01)
*G06F 8/34* (2018.01)
*G06F 8/41* (2018.01)
*G06N 10/40* (2022.01)

(52) U.S. Cl.

CPC ............... *G06N 10/80* (2022.01); *G06F 1/26* (2013.01); *G06F 8/34* (2013.01); *G06F 8/447* (2013.01); *G06N 10/40* (2022.01)

(58) Field of Classification Search

None

See application file for complete search history.

(56) References Cited

U.S. PATENT DOCUMENTS

2018/0152294 A1* 5/2018 Legre .................... H04L 9/0852
2021/0286601 A1* 9/2021 Fitzsimons ............... G06F 8/72
2021/0326738 A1* 10/2021 Kanno .................... G06F 17/18
2021/0357798 A1* 11/2021 Shani .................. G06F 12/0238

FOREIGN PATENT DOCUMENTS

JP 2021-170198 A 10/2021

OTHER PUBLICATIONS

Frank Arute et al., "Quantum supremacy using a programmable superconducting processor", Nature, vol. 574, Oct. 24, 2019, pp. 505-511.
L. Petit et al., "Universal quantum logic in hot silicon qubits", Nature, vol. 580, Apr. 16, 2020, pp. 355-359.
Extended European Search Report received in corresponding European Application No. 23158417.8 dated Jul. 17, 2023.

(Continued)

*Primary Examiner* — Haimei Jiang
(74) *Attorney, Agent, or Firm* — MATTINGLY & MALUR, PC

(57) ABSTRACT

A control system for controlling a quantum computer is coupled to an analog control unit configured to generate a control signal for controlling a quantum bit device including a plurality of quantum bits. The control system converts, first control flow data which is described in a code format and defines control details of the quantum bit device into second control flow data which defines the control details of the quantum bit device by the analog control unit; and generate a plurality of the control data patterns from the second control flow data based on the third setting information.

13 Claims, 20 Drawing Sheets

(56) References Cited

OTHER PUBLICATIONS

Khammassi, N. et al., "OpenQL: A Portable Quantum Programming Framework for Quantum Accelerators", May 27, 2020, Delft University of Technology, The Netherlands, Abstract; Sections I and III-VII; Figure 8.

Serrao, Miguel D. et al., "QuTech Central Controller: A Quantum Control Architecture for a Surface-17 Logical Qubit", May 10, 2019, Delft University of Technology, The Netherlands, Chapter 3 and 4; Figures 3.6, 4.3, 4.7, and 4.10.

* cited by examiner

230

```
ReadBiasSetting(bias_setting.file)
ReadSignalSetting(signal_setting.file)

RXRY_0_0():

    BiasV('VL2n', 0.2)

    Block(1, interval):
        ApplyV('XJN1', 'VL2n')
        ApplyV('XJS1', 'VL1s')
        ApplyV('XJN2', 'VL1n')
        ApplyV('XJS2', 'VL2s')
        ApplyV('YJW0', 'VL3w')
        ApplyV('YJE0', 'VL4e')
        ApplyV('YJW1', 'VL3e')
        ApplyV('YJE1', 'VL4w')
        ApplyRF(delay, width, phase, amp)

    Block(2, interval):
        ApplyV('XJN1', 'VL1n')
        ApplyV('XJS1', 'VL2s')
        ApplyV('XJN2', 'VL2n')
        ApplyV('XJS2', 'VL1s')
        ApplyV('YJW0', 'VL4w')
        ApplyV('YJE0', 'VL3e')
        ApplyV('YJW1', 'VL3w')
        ApplyV('YJE1', 'VL4e')

    Block(3, interval):
        ApplyV('XJN1', 'VL')
        ApplyV('XJS1', 'VL')
        ApplyV('XJN2', 'VL')
        ApplyV('XJS2', 'VL')
        ApplyV('YJW0', 'VL')
        ApplyV('YJE0', 'VL')
        ApplyV('YJW1', 'VL')
        ApplyV('YJE1', 'VL')
```

*FIG. 6*

232

```
#Signal_group, Signal_id, Signal_name↓
'X1', 0, ↓
'X1', 1, 'XQ1' ↓
'X1', 'XQ2' ↓
…
'X3', 76, 'XJS16' ↓
'X3', 77, 'XJS16' ↓

'Y1', 10, 'YQW0' ↓
'Y1', 11, 'YQW1' ↓
…
'Y4', 67, 'YJE7' ↓
'Y4', 70, 'YJE8' ↓
```

*FIG. 11*

233

```
#Bias_id, Bias_name, defalt_value ↓
0, 'VL', 0.5 ↓
1, 'VH', 2.0 ↓
2, 'VS1', 1.0 ↓
3, 'VS2', 1.7 ↓
4, 'Vres', ↓
5, 'Vtes', ↓
…
```

*FIG. 12*

234

Command List↓
Action : Command_name
*Bias DAC register set: DBS ↓*
*Bias write to Qubit device: BSW ↓*
*Bias apply strove: BSE ↓*
*RF generator set: RFW↓*
*RF apply strove: RFS ↓*
*Read strove: RM ↓*
*Pattem end: END ↓*
*None: NOP↓*

FIG. 15

1310

```
ReadBiasSetting(bias_setting.file)
ReadSignalSetting(signal_setting.file)
AllSetBiasV()

RXRY_0_0():

    DBS('VL2n', 0.2)

    Block(1, interval):
        BSW(1, 'XJN1', 'VL2n')
        BSW(1, 'XJS1', 'VL1s')
        BSW(1, 'XJN2', 'VL1n')
        BSW(1, 'XJS2', 'VL2s')
        BSW(1, 'YJW0', 'VL3w')
        BSW(1, 'YJE0', 'VL4e')
        BSW(1, 'YJW1', 'VL3e')
        BSW(1, 'YJE1', 'VL4w')
        BSE(1, 0)
        RFW(1, width, phase, amp)
        RFS(1, 10)

    Block(2, interval):
        BSW(1, 'XJN1', 'VL1n')
        BSW(1, 'XJS1', 'VL2s')
        BSW(1, 'XJN2', 'VL2n')
        BSW(1, 'XJS2', 'VL1s')
        BSW(1, 'YJW0', 'VL4w')
        BSW(1, 'YJE0', 'VL3e')
        BSW(1, 'YJW1', 'VL3w')
        BSW(1, 'YJE1', 'VL4e')
        BSE(1, 0)

    Block(2, interval):
        BSW(1, 'XJN1', 'VL')
        BSW(1, 'XJS1', 'VL')
        BSW(1, 'XJN2', 'VL')
        BSW(1, 'XJS2', 'VL')
        BSW(1, 'YJW0', 'VL')
        BSW(1, 'YJE0', 'VL')
        BSW(1, 'YJW1', 'VL')
        BSW(1, 'YJE1', 'VL')
        BSE(1, 0)

    END(1)
```

*FIG. 16*

1311

```
ReadBiasSetting(bias_setting.file)
ReadSignalSetting(signal_setting.file)
AllSetBiasV()

RXRY_0_0():

    PTN(1, BSW(1, [‘XJN1’, ‘VL2n’], [‘YJW0’, ‘VL3w’], []), RFW(1, width, phase, amp))
    PTN(1, BSW(1, [‘XJS1’, ‘VL1s’], [‘YJE0’, ‘VL4e’], []), NOP(1))
    PTN(1, BSW(1, [‘XJN2’, ‘VL1n’], [‘YJw1’, ‘VL3e’], []), NOP(1))
    PTN(1, BSW(1, [‘XJS2’, ‘VL2s’], [‘YJE1’, ‘VL4w’], []), NOP(1))
    PTN(1, BSW(1, [‘XJN1’, ‘VL1n’], [‘YJW0’, ‘VL4w’], []), BSE(1, 0))
    PTN(1, BSW(1, [‘XJS1’, ‘VL2s’], [‘YJE0’, ‘VL3e’], []), RFS(1, 10))
    PTN(1, BSW(1, [‘XJN2’, ‘VL2n’], [‘YJw1’, ‘VL4e’], []), NOP(1))
    PTN(1, BSW(1, [‘XJS2’, ‘VL1s’], [‘YJE1’, ‘VL3w’], []), NOP(1))
    PTN(1, BSW(1, [‘XJN1’, ‘VL’], [‘YJW0’, ‘VL’], []), BSE(1, 0))
    PTN(1, BSW(1, [‘XJS1’, ‘VL’], [‘YJE0’, ‘VL’], []), NOP(1))
    PTN(1, BSW(1, [‘XJN2’, ‘VL’], [‘YJw1’, ‘VL’], []), NOP(1))
    PTN(1, BSW(1, [‘XJS2’, ‘VL’], [‘YJE1’, ‘VL’], []), NOP(1))
    PTN(1, MOP(1), BSE(1, 0))
    PTN(1, END(1), NOP(1))
```

FIG. 18

| Command0 | DATA0 | | | | | | Command1 | DATA1 | | |
|---|---|---|---|---|---|---|---|---|---|---|
| 000 | 000000 | 0000000000000000 | 000000 | 0000000000000000 | 000000 | 0000000000000000 | 000 | 0000000000 | 0000000000 | 00000000 |
| 010 | 000 | 000000 | 001 | 101000 | 010 | 011110 | 011 | 1100100000 | 0001100100 | 011110 |
| 010 | 000 | 000000 | 010 | 111100 | 001 | 111100 | 000 | 0000000000 | 0000000000 | 00000000 |
| 010 | 000 | 000000 | 010 | 101001 | 001 | 011111 | 000 | 0000000000 | 0000000000 | 00000000 |
| 010 | 000 | 000000 | 001 | 111101 | 010 | 111101 | 000 | 0000000000 | 0000000000 | 00000000 |
| 010 | 000 | 000000 | 010 | 101000 | 001 | 011110 | 001 | 00000 | 00000000 | 00000000 |
| 010 | 000 | 000000 | 001 | 111100 | 010 | 111100 | 010 | 00000 | 00000100 | 10110000 |
| 010 | 000 | 000000 | 001 | 101001 | 010 | 011111 | 000 | 0000000000 | 0000000000 | 00000000 |
| 010 | 000 | 000000 | 010 | 111101 | 001 | 111101 | 000 | 0000000000 | 0000000000 | 00000000 |
| 010 | 000 | 000000 | 000 | 101000 | 000 | 011110 | 001 | 00000 | 00000000 | 00000000 |
| 010 | 000 | 000000 | 000 | 111100 | 000 | 111100 | 000 | 0000000000 | 0000000000 | 00000000 |
| 010 | 000 | 000000 | 000 | 101001 | 000 | 011111 | 000 | 0000000000 | 0000000000 | 00000000 |
| 010 | 000 | 000000 | 000 | 111101 | 000 | 111101 | 000 | 0000000000 | 0000000000 | 00000000 |
| 000 | 000000 | 0000000000000000 | 000000 | 0000000000000000 | 000000 | 0000000000000000 | 001 | 00000 | 00000000 | 00000000 |
| 111 | 000000 | 0000000000000000 | 000000 | 0000000000000000 | 000000 | 0000000000000000 | 000 | 0000000000 | 0000000000 | 00000000 |

251

FIG. 21

CONTROL SYSTEM AND QUANTUM COMPUTER CONTROL METHOD

CLAIM OF PRIORITY

The present application claims priority from Japanese patent application JP 2022-135822 filed on Aug. 29, 2022, the content of which is hereby incorporated by reference into this application.

BACKGROUND OF THE INVENTION

This invention relates to a technology for controlling a quantum computer.

The miniaturization of semiconductor elements, which have supported the progress of computers, is reaching its limits, and it is becoming more difficult to increase computing power by extending conventional classical computers. Under such circumstances, quantum computers are expected to be one attempt to break through the performance limits with new computational principles and devices.

A quantum computer is a computer that uses quantum mechanical phenomena such as superposition and quantum entanglement to implement an exponentially large number of parallel calculations. Quantum computers are said to be capable of faster calculations than classical computers if operated as theorized. Attempts to practically use quantum computers are spreading worldwide, and the achievement of gate-type quantum computers of about several tens of quantum bits has been reported so far (see, for example, Frank Arute, et al., "Quantum supremacy using a programmable superconducting processor," Nature, Vol 574, pp. 505-511, 2019.).

However, the quantum computers currently under development do not have an error correction function, and are far from true general-purpose quantum computers which require around one million quantum bits. Studies are being conducted toward the achievement of large-scale quantum computers.

In JP 2021-170198 A, there is disclosed a silicon electron spin type massively parallel quantum computer built from quantum computation units having a plurality of quantum bits in a quantum bit array. Further, in Petit, L. et al., "Universal quantum logic in hot silicon qubits," Nature, Vol 580, pp. 355-359, 2020, there is discussed a method for achieving larger scales with a quantum bit device and a quantum peripheral circuit for controlling the quantum bit device.

SUMMARY OF THE INVENTION

There have been hardware attempts to increase the scale of quantum computers, but the verification of such quantum computers remains experimental, which involves targeting a small number of quantum bits and directly coupling the quantum bits to a control device. In order to control a large-scale quantum computer, in addition to developing the quantum bit device, it is required to develop a system that efficiently controls the large number of arrayed quantum bits.

The development of large-scale quantum computer systems requires knowledge of different layers, such as knowledge of quantum devices, control circuits, and quantum algorithms, and the development of the underlying technologies relating to such knowledge. As the number of quantum bits to be controlled increases together with the system of the peripheral control circuits, control becomes more complex and difficult to understand.

Therefore, there is a demand for a system that enables a user who is developing and verifying a quantum computer to more intuitively control the quantum computer without using knowledge of various layers such as hardware settings.

This invention has been made in view of the circumstances described above, and it is an object thereof to provide a technology that enables a user to control a quantum computer even without having knowledge of various layers.

A representative example of the present invention disclosed in this specification is as follows: a control system for controlling a quantum computer comprises a computer including a processor, a memory coupled to the processor, and a network interface coupled to the processor. The control system is coupled to an analog control unit configured to generate a control signal for controlling a quantum bit device including a plurality of quantum bits. The control system is configured to hold first setting information relating to a setting parameter for controlling the quantum bit device, second setting information relating to control of the analog control unit, and third setting information relating to a format of a control data pattern for generating the control signal. The processor is configured to: convert, based on the first setting information and the second setting information, first control flow data which is described in a code format and defines control details of the quantum bit device into second control flow data which defines the control details of the quantum bit device by the analog control unit; and generate a plurality of the control data patterns from the second control flow data based on the third setting information.

According to the at least one embodiment of this invention, a user can control a quantum computer even without having knowledge of various layers. Other problems, configurations, and effects than those described above will become apparent in the descriptions of embodiments below.

BRIEF DESCRIPTION OF THE DRAWINGS

The present invention can be appreciated by the description which follows in conjunction with the following figures, wherein:

FIG. 6 is a diagram for illustrating an example of the control flow data (code description) in the first embodiment;

FIG. 11 is a diagram for illustrating an example of signal information in the first embodiment;

FIG. 12 is a diagram for illustrating an example of bias voltage information in the first embodiment;

FIG. 15 is a diagram for illustrating an example of execution command information in the first embodiment;

FIG. 16 is a diagram for illustrating an example of the control unit level code in the first embodiment;

FIG. 18 is a diagram for illustrating an example of a constraint consideration control unit level code in the first embodiment;

FIG. 21 is a diagram for illustrating an example of control data pattern information in the first embodiment.

DETAILED DESCRIPTION OF THE PREFERRED EMBODIMENTS

Figure 1:
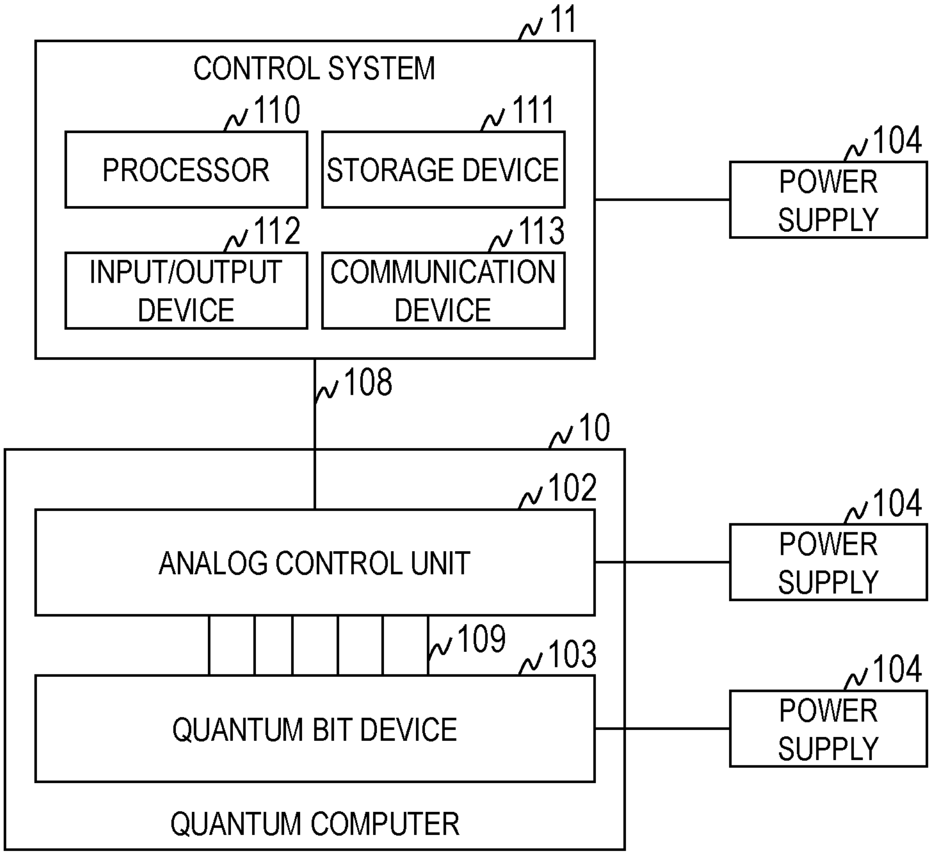
FIG. 1 is a block diagram for illustrating an example of a hardware configuration of a system according to a first embodiment.

Now, description is given of at least one embodiment of this invention referring to the drawings. It should be noted that this invention is not to be construed by limiting the invention to the content described in the following at least one embodiment. A person skilled in the art would easily recognize that specific configurations described in the following at least one embodiment may be changed within the scope of the concept and the gist of this invention.

In configurations of the at least one embodiment of this invention described below, the same or similar components or functions are denoted by the same reference numerals, and a redundant description thereof is omitted here.

Notations of, for example, "first," "second," and "third" herein are assigned to distinguish between components, and do not necessarily limit the number or order of those components.

The position, size, shape, range, and others of each component illustrated in, for example, the drawings may not represent the actual position, size, shape, range, and others in order to facilitate understanding of this invention. Thus, this invention is not limited to the position, size, shape, range, and others disclosed in, for example, the drawings.

First Embodiment

In a first embodiment of this invention, description is given of a control system which, in the research and development and the verification of a large-scale quantum computer, enables a user who is developing a quantum device and a system, for example, to control the quantum device demanded by the user while masking complex settings of layers different from the quantum device.

FIG. 1 is a block diagram for illustrating an example of a hardware configuration of a system according to the first embodiment.

The system is built from a quantum computer 10 and a control system 11. The quantum computer 10 is built from an analog control unit 102 and a quantum bit device 103. The quantum computer 10 and the control system 11 are supplied with electric power from power supplies 104.

The control system 11 controls the whole quantum computer 10. The analog control unit 102 generates, based on outputs of the control system 11, analog control signals, for example, a bias voltage, an RF signal, and a timing signal, for controlling the quantum bit device 103. The analog control unit 102 includes, for example, an analog control circuit or a signal generator. The quantum bit device 103 is a device which performs quantum calculations, and includes a plurality of quantum bits. The quantum bit device 103 includes, for example, a quantum bit chip on which quantum bits are arranged.

The quantum bit device 103 is placed in an ultralow temperature region in a dilution refrigerator in order to stably operate the quantum bits. The analog control unit 102, which directly controls the quantum bit device 103, is arranged in a low temperature region around the quantum bit device 103. The control system 11 is arranged in a normal temperature region.

The analog control unit 102 and the quantum bit device 103, which are arranged in regions close to each other, are directly coupled to each other via wires 109, and the control system 11 and the analog control unit 102 are coupled to each other via a communication cable 108.

The control system 11 includes a processor 110, a storage device 111, an input/output device 112, and a communication device 113. The control system 11 may be built from a plurality of computers.

The processor 110 executes programs stored in the storage device 111. The processor 110 operates as a functional module (module) which implements a specific function by executing processing in accordance with a program. In the following description, when processing is described with a functional module as the subject of the sentence, this means that the processor 110 is executing the program for implementing the functional module. The storage device 111 stores programs to be executed by the processor 110 and information to be used by the programs. The storage device 111 is also used as a work area.

The input/output device 112 is, for example, a keyboard, a mouse, a touch panel, and a display, and receives inputs of various types of information and outputs various types of information. The communication device 113 communicates to and from the analog control unit 102.

The control system 11 may be built from a plurality of computers each including the processor 110, the storage device 111, the input/output device 112, and the communication device 113.

Figure 2:
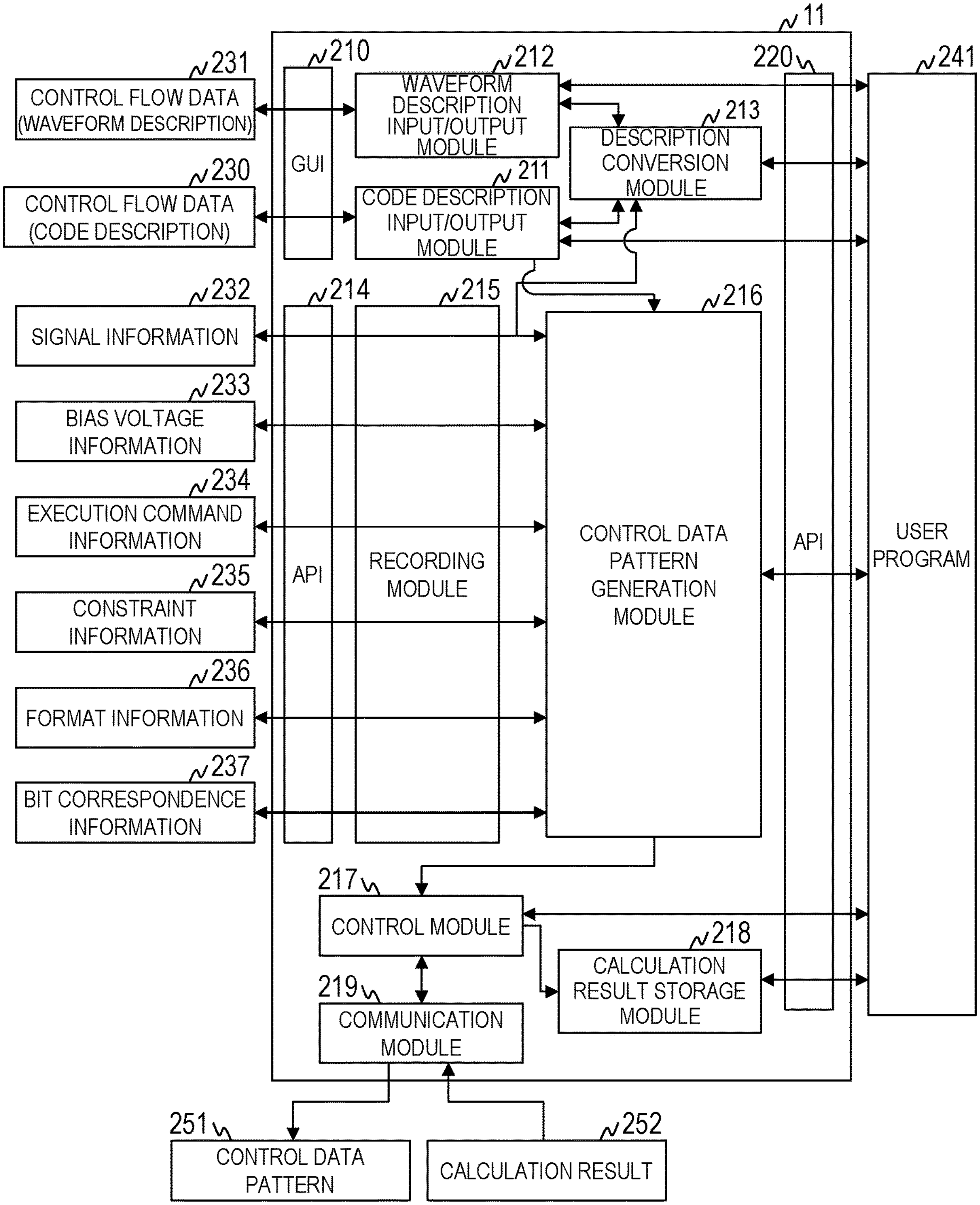
FIG. 2 is a block diagram for illustrating an example of a functional configuration of a control system of the first embodiment.

FIG. 2 is a block diagram for illustrating an example of a functional configuration of the control system 11 of the first embodiment.

The control system 11 includes a graphical user interface (GUI) 210, a code description input/output module 211, a waveform description input/output module 212, a description conversion module 213, an application programming interface (API) 214, a recording module 215, a control data pattern generation module 216, a control module 217, a calculation result storage module 218, a communication module 219, and an API 220.

The GUI 210 receives inputs of data (control flow data) relating to a control flow which defines the control details of the quantum bit device 103. In the first embodiment, the GUI 210 can receive two inputs which are expressed by different methods, namely, control flow data (code description) 230 and control flow data (waveform description) 231. The GUI 210 outputs the received control flow data (code description) 230 to the code description input/output module 211, and outputs the received control flow data (waveform description) 231 to the waveform description input/output module 212.

In the following description, when the control flow data (code description) 230 and the control flow data (waveform description) 231 are not distinguished, those piece of control flow data are referred to as "control flow data."

The description conversion module 213 converts between the control flow data (code description) 230 and the control flow data (waveform description) 231 in a case where an execution trigger of processing for converting the expression method of the control flow data is detected.

The GUI 210, the code description input/output module 211, the waveform description input/output module 212, and the description conversion module 213 may be integrated into a single control flow reception module.

The API 214 receives inputs of information relating to the analog control unit 102 and the quantum bit device 103. Specifically, the API 214 receives signal information 232 and bias voltage information 233 as information on setting parameters for controlling the quantum bit device 103. Further, the API 214 receives execution command information 234 and constraint information 235 as information relating to the control by the analog control unit 102. The API 214 also receives format information 236 and bit correspondence information 237 as information relating to the data structure of a control data pattern 251, which is executable by the analog control unit 102 and is for generating the control signals to be used for controlling the quantum bit device 103. The recording module 215 stores the various types of information received by the API 214.

The API 214 and the recording module 215 may be integrated into a single information setting module.

The control data pattern generation module 216 obtains the control flow data (code description) 230 from the code description input/output module 211, and uses the control flow data (code description) 230 and the information stored in the recording module 215 to generate the control data pattern 251 for generating the control signals to be used for controlling the quantum bit device 103.

Figure 13:
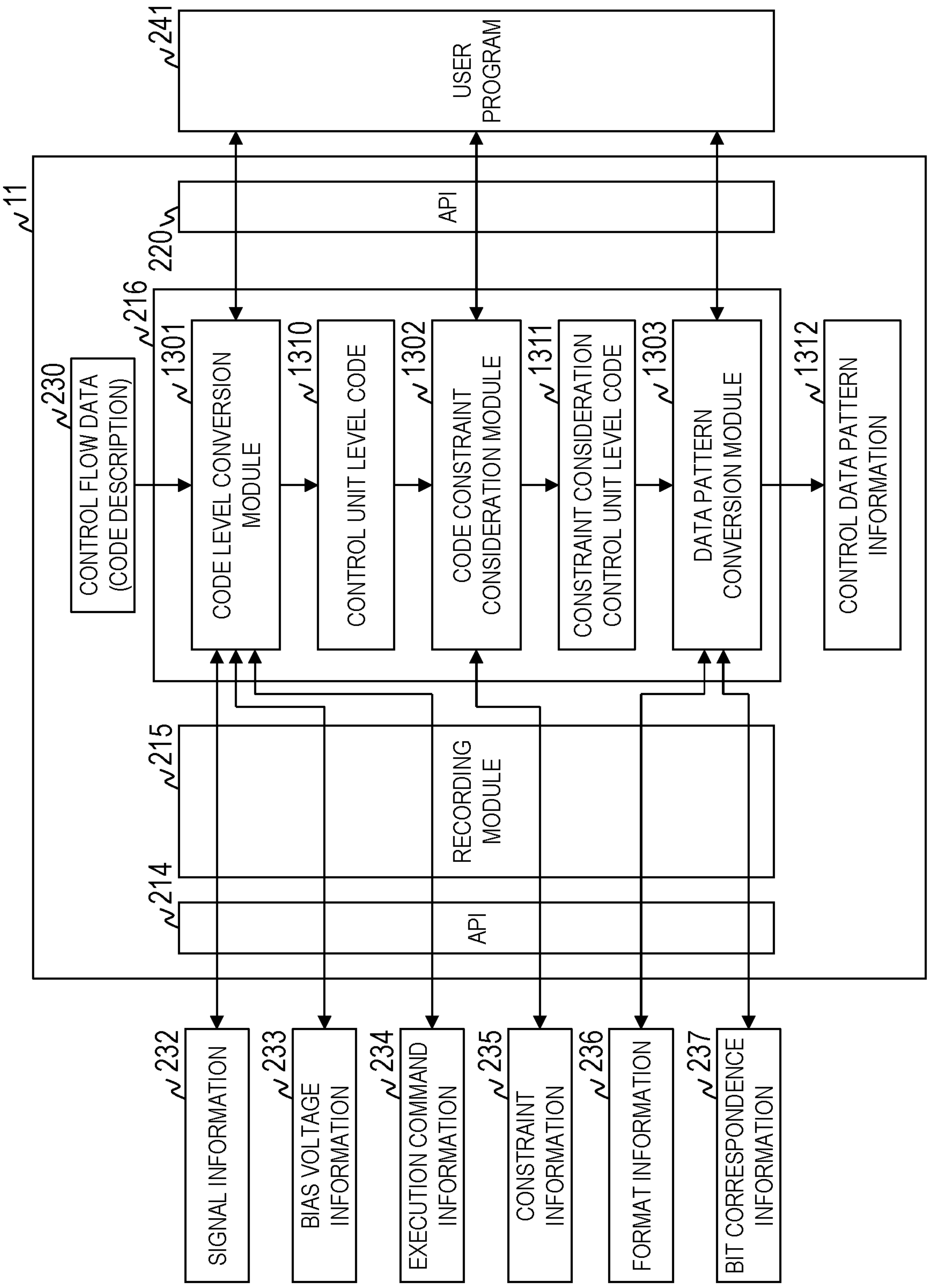
FIG. 13 is a diagram for illustrating a functional configuration relating to a control unit level, a constraint consideration level, and a data pattern conversion level of the control system of the first embodiment.

The control module 217 obtains and stores control data pattern information 1312 illustrated in FIG. 13, which stores a plurality of control data patterns 251, from the control data pattern generation module 216. The control module 217 outputs a control data pattern 251 to the communication module 219 in a case where an execution trigger for the control processing of the quantum computer 10 is detected. Further, the control module 217 receives a calculation result 252 from the communication module 219, and stores the calculation result 252 in the calculation result storage module 218.

The communication module 219 controls the communication device 113 to transmit the control data pattern 251 to the analog control unit 102. Further, the communication module 219 controls the communication device 113 to receive the calculation result 252 from the analog control unit 102 and output the received calculation result 252 to the control module 217.

The control module 217, the calculation result storage module 218, and the communication module 219 may be integrated into a single control execution module. The API 220 receives inputs of execution triggers for various processes and files from a user program 241. Further, the API 220 outputs the execution results (for example, error information and calculation result 252) of various processes to the user program 241.

The processing executed by the control system 11 consists of five processing levels, namely, a user description level, a control unit level, a constraint consideration level, a data pattern conversion level, and an execution control level.

(Level 1) User Description Level

The user description level is processing executed by the control flow reception module for converting between the control flow data (code description) 230 and the control flow data (waveform description) 231.

Figure 3:
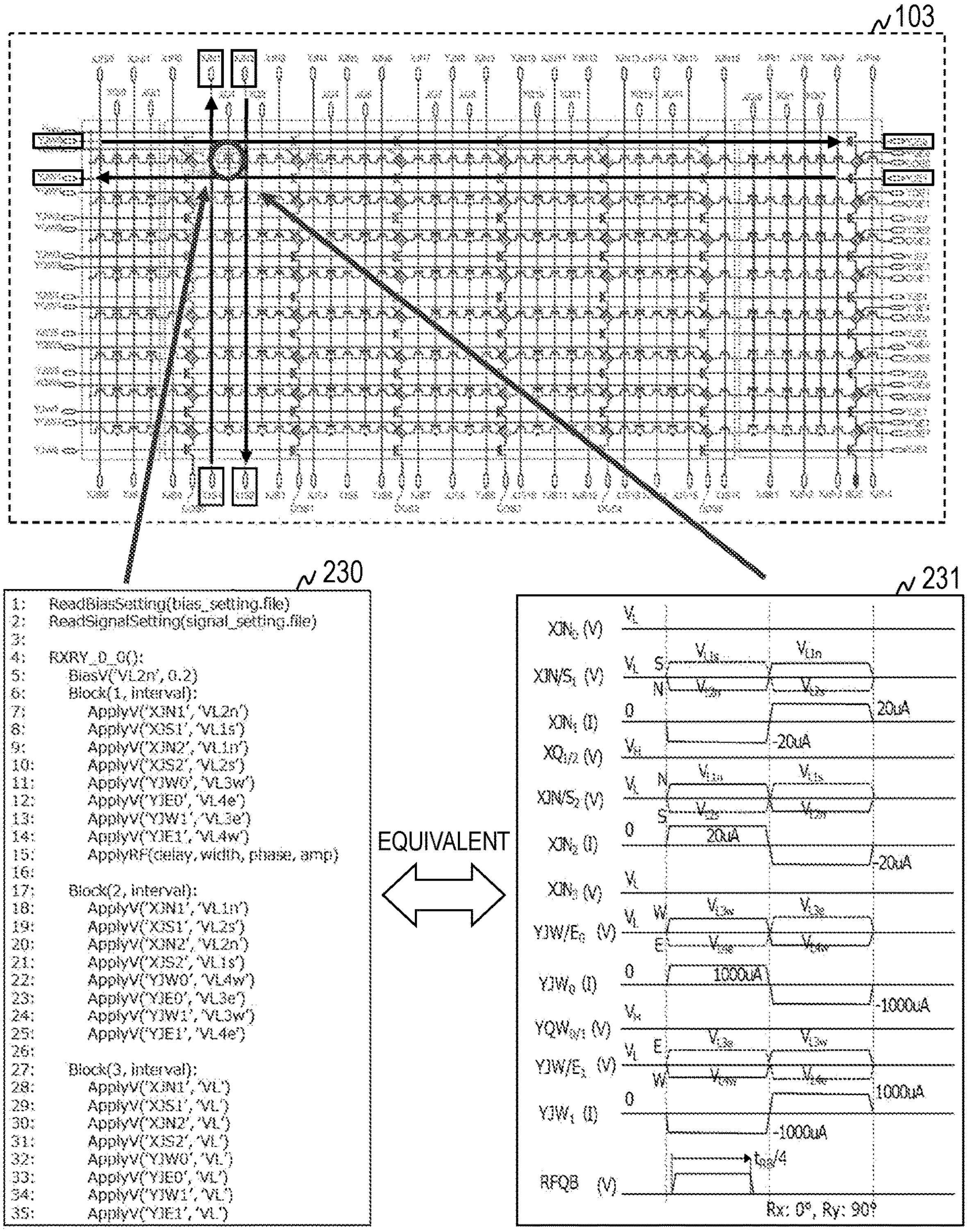
FIG. 3 is a diagram for illustrating an example of control flow data (code description) and control flow data (waveform description) for controlling a quantum bit device in the first embodiment.
Figure 4:
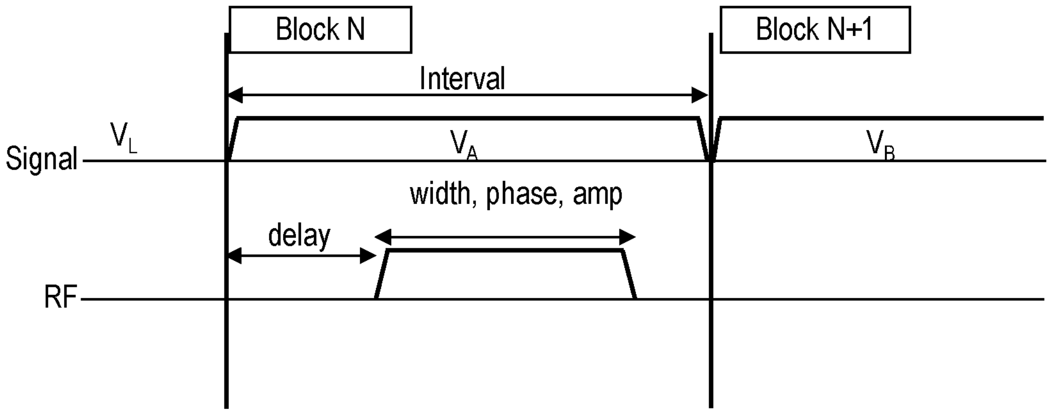
FIG. 4 is a diagram for illustrating an example of parameters of a control flow in the first embodiment.
Figure 5:
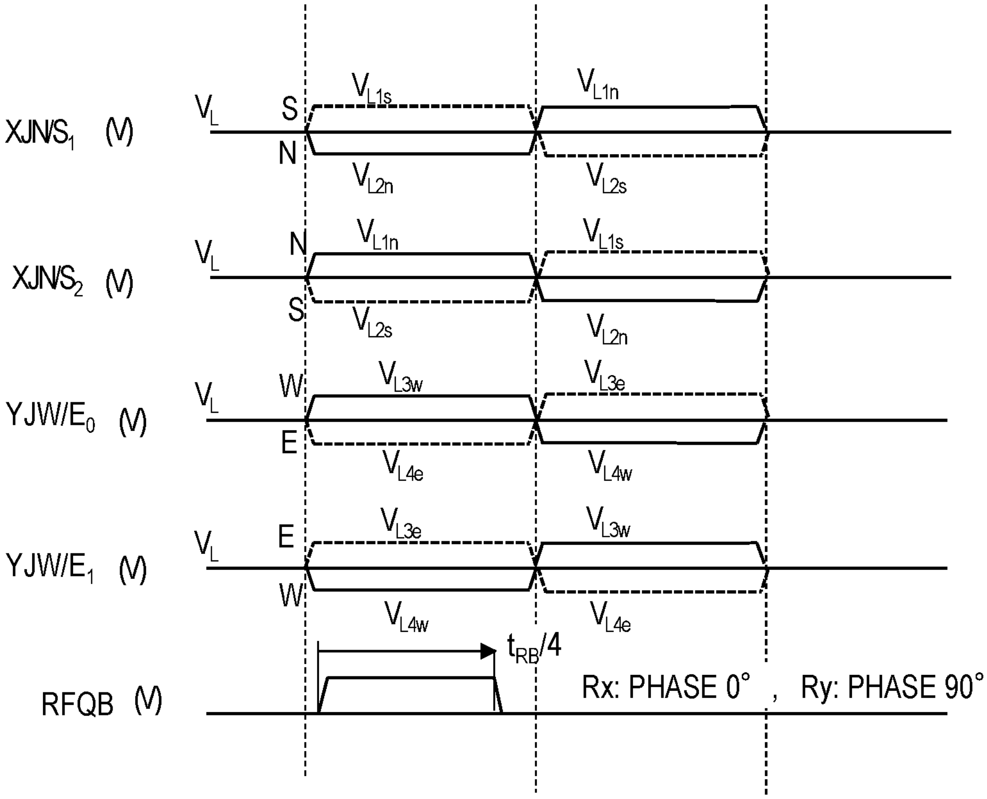
FIG. 5 is a diagram for illustrating an example of the control flow data (waveform description) in the first embodiment.

FIG. 3 is a diagram for illustrating an example of the control flow data (code description) 230 and the control flow data (waveform description) 231 for controlling the quantum bit device 103 in the first embodiment. FIG. 4 is a diagram for illustrating an example of parameters of the control flow in the first embodiment. FIG. 5 is a diagram for illustrating an example of the control flow data (waveform description) 231 in the first embodiment. FIG. 6 is a diagram for illustrating an example of the control flow data (code description) 230 in the first embodiment.

In FIG. 3, there is illustrated control flow data for the quantum bit device 103 in which quantum bits are arranged in array. In FIG. 3, control flow data for controlling the quantum bit indicated by the circle is illustrated. The control flow defines the timing at which, for example, a bias voltage and an RF signal are applied to a signal terminal in order to control the quantum bit.

The control flow data (code description) 230 and the control flow data (waveform description) 231 are equivalent data having different description methods. The control flow data (code description) 230 describes the control flow by using the same expression as that of a program code, for example, and the control flow data (waveform description) 231 describes the control flow in a sequence of signal waveforms.

From the point of view of the user who is developing and verifying the quantum bit device 103, the control flow data (waveform description) 231, which is close to the expression of a measuring device such as a tester, is easier to handle. In the control flow data (waveform description) 231 illustrated in FIG. 3, the control for inducing a reverse current in the wire adjacent to the quantum bit is intuitively expressed.

Meanwhile, from the point of view of the system, the control flow data (code description) 230, which is expressed like a program code, is easier to handle. The control flow data (code description) 230 is not an expression from which the control details can be visually grasped, and hence the visibility is inferior to that of the control flow data (waveform description) 231, but the degree of freedom of the expression is excellent because reuse of iterative processing or the like and generalization by parameterization of the quantum bit addresses can be carried out. The control flow data (code description) 230 is also easier to handle than the control flow data (waveform description) 231 in the processing performed on the control system 11.

(Level 2) Control Unit Level

The control unit level is one of the processes executed by the control data pattern generation module 216 for converting the control flow data (code description) 230 to commands (control unit level code 1310) having granularities executable by the analog control unit 102. At the control unit level, the signal information 232, the bias voltage information 233, and the execution command information 234 are referred to.

(Level 3) Constraint Consideration Level

The constraint consideration level is one of the processes executed by the control data pattern generation module 216 for converting the control unit level code 1310 into a constraint consideration control unit level code 1311 in accordance with the constraint relating to the control by the analog control unit 102. At the constraint consideration level, the constraint information 235 is referred to.

(Level 4) Data Pattern Conversion Level

The data pattern conversion level is one of the processes executed by the control data pattern generation module 216 for converting the constraint consideration control unit level code 1311 into the control data pattern 251. At the data pattern conversion level, the format information 236 and the bit correspondence information 237 are referred to.

(Level 5) Execution Control Level

The execution control level is processing of controlling the quantum computer by using the control data pattern 251. At the execution control level, processing such as transmission of the control data pattern 251 to the analog control unit 102 and reception and storage of calculation results is executed.

The control system 11 of the first embodiment receives, via the GUI 210, input of highly reusable control flow data (code description) 230 and highly visible control flow data (waveform description) 231 from the user who is developing and verifying the quantum bit device 103 or the user who is developing and verifying the system. The control flow data (waveform description) 231 is an easy-to-handle expression that is suitable for the user who is developing and verifying the quantum bit device 103 to intuitively operate the quantum bits.

The control system 11 of the first embodiment separately includes the API 214 for receiving the information to be used for processing and the API 220 for receiving a processing execution trigger, and hence each of the five processing levels can be executed independently.

Through setting in advance the information to be used at each processing level, it is possible to verify a predetermined processing level without the user being required to perform complicated settings for another processing level. For example, the user who is developing and verifying the quantum bit device 103 can control the quantum bit device 103 without having knowledge of the analog control unit 102, for example. Further, the user can obtain error information, the processing result of each processing level, the calculation results 252, and the like via the API 220.

Next, the processing to be executed by the control system 11 of the first embodiment is described for each processing level. The information to be referred to is also described together with the description of the processing.

It is assumed that the signal information 232, the bias voltage information 233, the execution command information 234, the constraint information 235, the format information 236, and the bit correspondence information 237 are stored in advance in the recording module 215 via the API 214.

(User Description Level)

Figure 7:
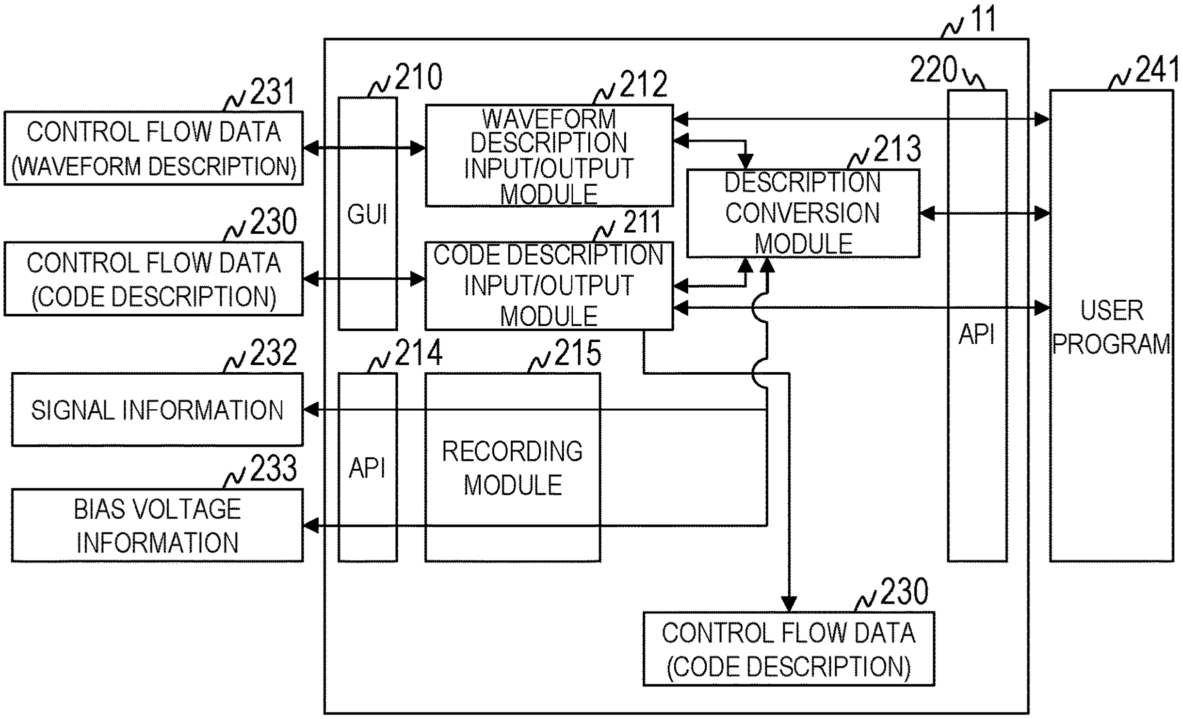
FIG. 7 is a diagram for illustrating a functional configuration relating to a user description level of the control system of the first embodiment.
Figure 8:
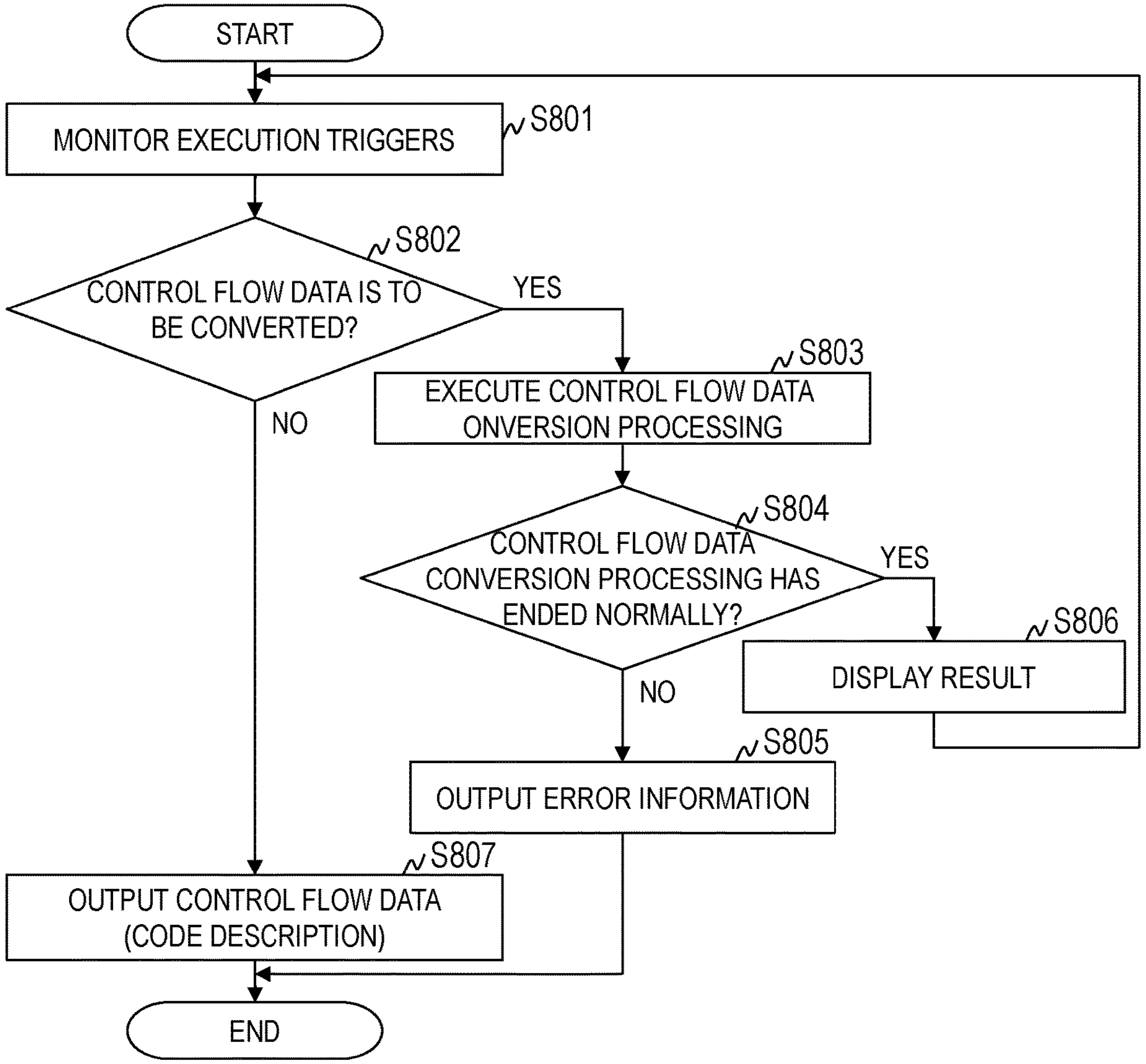
FIG. 8 is a flowchart for illustrating an example of the user description level to be executed by the control system of the first embodiment.
Figure 9:
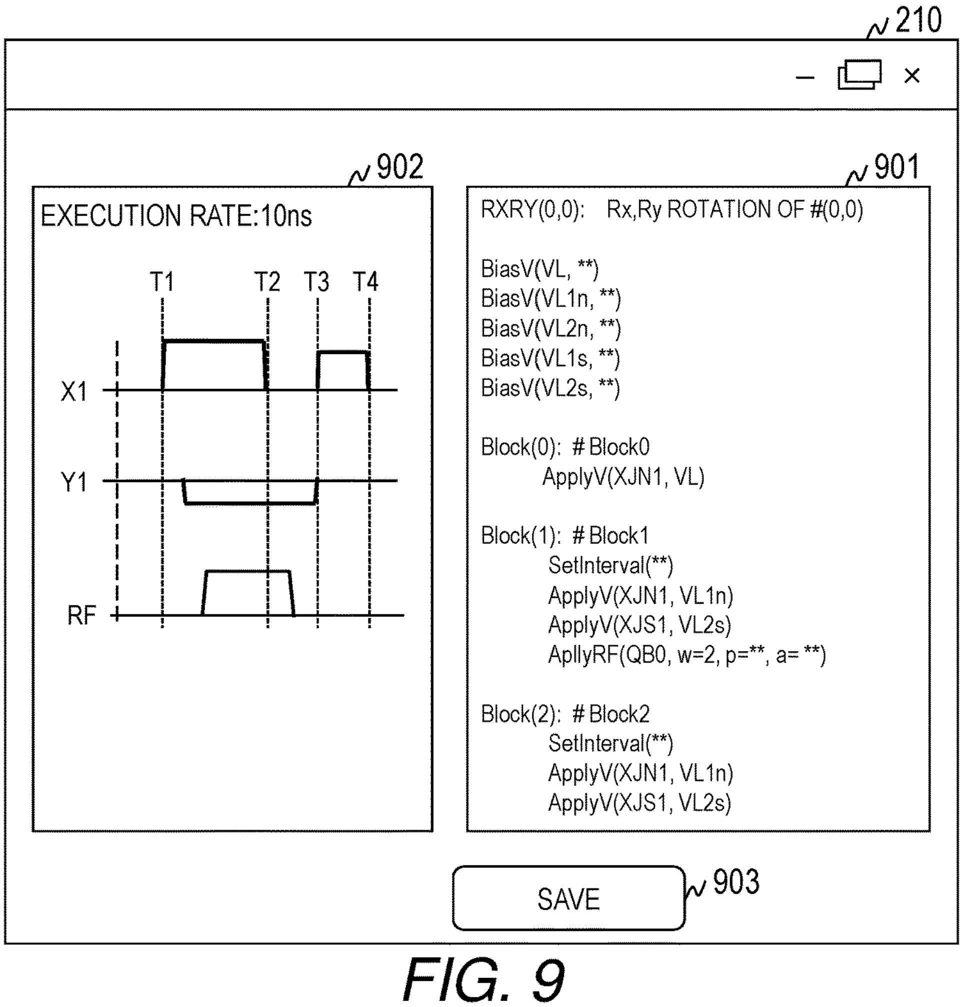
FIG. 9 is a diagram for illustrating an example of a GUI in the first embodiment.
Figure 10:
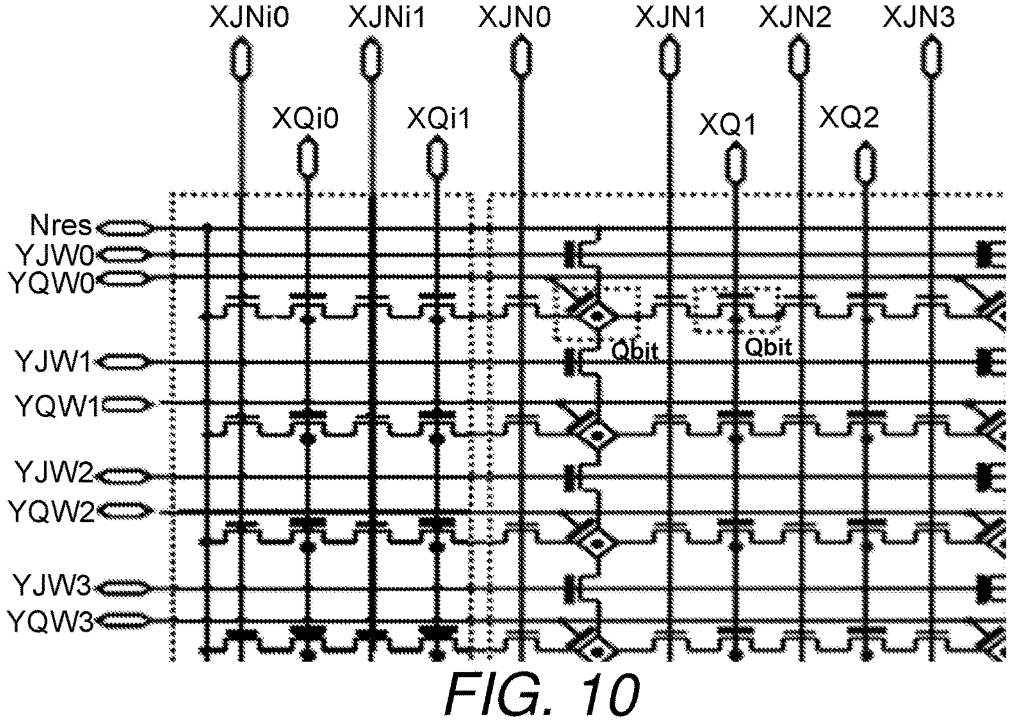
FIG. 10 is a diagram for illustrating an example of the structure of the quantum bit device in the first embodiment.

FIG. 7 is a diagram for illustrating a functional configuration relating to the user description level of the control system 11 of the first embodiment. FIG. 8 is a flowchart for illustrating an example of the user description level to be executed by the control system 11 of the first embodiment. FIG. 9 is a diagram for illustrating an example of the GUI 210 in the first embodiment. FIG. 10 is a diagram for illustrating an example of the structure of the quantum bit device 103 in the first embodiment. FIG. 11 is a diagram for illustrating an example of the signal information 232 in the first embodiment. FIG. 12 is a diagram for illustrating an example of the bias voltage information 233 in the first embodiment.

The control flow reception module displays the GUI 210 like that illustrated in FIG. 9, and receives inputs of the control flow data. The GUI 210 includes a code input/display field 901, a waveform input/display field 902, and a save button 903.

The code input/display field 901 is a field for inputting or displaying control flows expressed by a code description. The waveform input/display field 902 is a field for inputting or displaying control flows expressed by a waveform description. The save button 903 is an operation button for saving the control flow input to any one of the code input/display field 901 or the waveform input/display field 902. When the save button 903 is operated, the data of the control flow input to the any one of the code input/display field 901 or the waveform input/display field 902 is input to the control flow reception module.

After saving the control flow data, the control flow reception module monitors execution triggers (Step S801).

Specifically, the code description input/output module 211 and the waveform description input/output module 212 monitor execution triggers. Execution triggers are received from the user program 241 via the API 220. The function of receiving the execution trigger may be implemented in the GUI 210. For example, when the save button 903 is pressed, an execution trigger for control flow data conversion processing may be input. The GUI 210 may also include a button for inputting the execution triggers of the control unit levels.

The control flow reception module can receive edits to the control flow data while monitoring execution triggers.

In a case where the control flow reception module detects an execution trigger, the control flow reception module determines whether or not the execution trigger is an execution trigger for control flow data conversion processing (Step S802).

In a case where the detected execution trigger is an execution trigger for control flow data conversion processing, the control flow reception module executes control flow data conversion processing (Step S803). Details of the control flow data conversion processing are described later.

The control flow reception module determines whether or not the control flow data conversion processing has ended normally (Step S804).

In a case where the control flow data conversion processing has not ended normally, the control flow reception module outputs error information to the user program 241 (Step S805), and ends the processing.

In a case where the control flow data conversion processing has ended normally, the control flow reception module displays the converted control flow on the GUI 210 (Step S806), and then returns the process to Step S801.

In Step S802, in a case where the detected execution trigger is an execution trigger of the control unit level, the control flow reception module stops monitoring execution triggers, and transmits control flow data (code description) 230 to the control data pattern generation module 216 (Step S807).

Description is now given of the control flow data conversion processing. The control flow data conversion processing is executed by the description conversion module 213.

(Conversion 1)

In a case where control flow data (code description) 230 is received, the description conversion module 213 uses the signal information 232 and the bias voltage information 233 to convert the control flow data (code description) 230 into control flow data (waveform description) 231.

In FIG. 10, the structure of a part of the quantum bit device 103 is illustrated. "XJNi0," "YJW0," and the like represent signal names of signal terminals. The quantum bit is controlled by applying bias voltages to the signal terminals. In order to describe the control flow, the signal names, and, for example, the names and values of the bias voltages are required. Signal information 232 is information defining the signal name, which is a setting parameter, and bias voltage information 233 is information defining the name and the value of the bias voltage, which is a setting parameter. The signal information 232 of the quantum bit device 103 illustrated in FIG. 10 is information like that illustrated in FIG. 11, for example. Further, the bias voltage information 233 of the quantum bit device 103 illustrated in FIG. 10 is information like that illustrated in FIG. 12, for example.

The description conversion module 213 refers to the signal information 232 and the bias voltage information 233 to determine whether or not there is an error in, for example, the signal name or the bias voltage name in the control flow data (code description) 230. In a case where there is an error in the description, the description conversion module 213 outputs error information and ends the conversion processing. In a case where there is no error in the description, the description conversion module 213 converts the control flow data (code description) 230 into control flow data (waveform description) 231 based on a correspondence between the code description and the waveform description. The description conversion module 213 stores the control flow data (waveform description) 231 in the waveform description input/output module 212. The waveform description input/output module 212 outputs the control flow data (waveform description) 231 to the GUI 210, and the GUI 210 displays the control flow data (waveform description) 231 in the waveform input/display field 902. The GUI 210 can receive edits to the control flow data (waveform description) 231. The result of the edits to the control flow data (waveform description) 231 is stored in the waveform description input/output module 212 via the GUI 210.

(Conversion 2)

In a case where the control flow data (waveform description) 231 is received, the description conversion module 213 converts the control flow data (waveform description) 231 into control flow data (code description) 230 based on a predetermined correspondence between the code description and the waveform description. The description conversion module 213 refers to the signal information 232 and the bias voltage information 233 to determine whether or not there is an error in, for example, the signal name or the bias voltage name in the control flow data (code description) 230. In a case where there is an error in the description, the description conversion module 213 outputs error information and ends the conversion processing. In a case where there is no error in the description, the description conversion module 213 stores the control flow data (code description) 230 in the code description input/output module 211. The code description input/output module 211 outputs the control flow data (code description) 230 to the GUI 210, and the GUI 210 displays the control flow data (code description) 230 in the code input/display field 901. The GUI 210 can receive edits to the control flow data (code description) 230. The result of edits to the control flow data (code description) 230 is stored in the code description input/output module 211 via the GUI 210.

The control system 11 can receive both a control flow of a highly reusable code description and a control flow of a waveform description from which the control details are visually graspable. Further, the control system 11 can mutually convert control flows having different expressions between one another and present the converted control flows to the user. The user can efficiently edit a control flow by referring to the converted control flow.

(Control Unit Level, Constraint Consideration Level, and Data Pattern Conversion Level)

Figure 14:
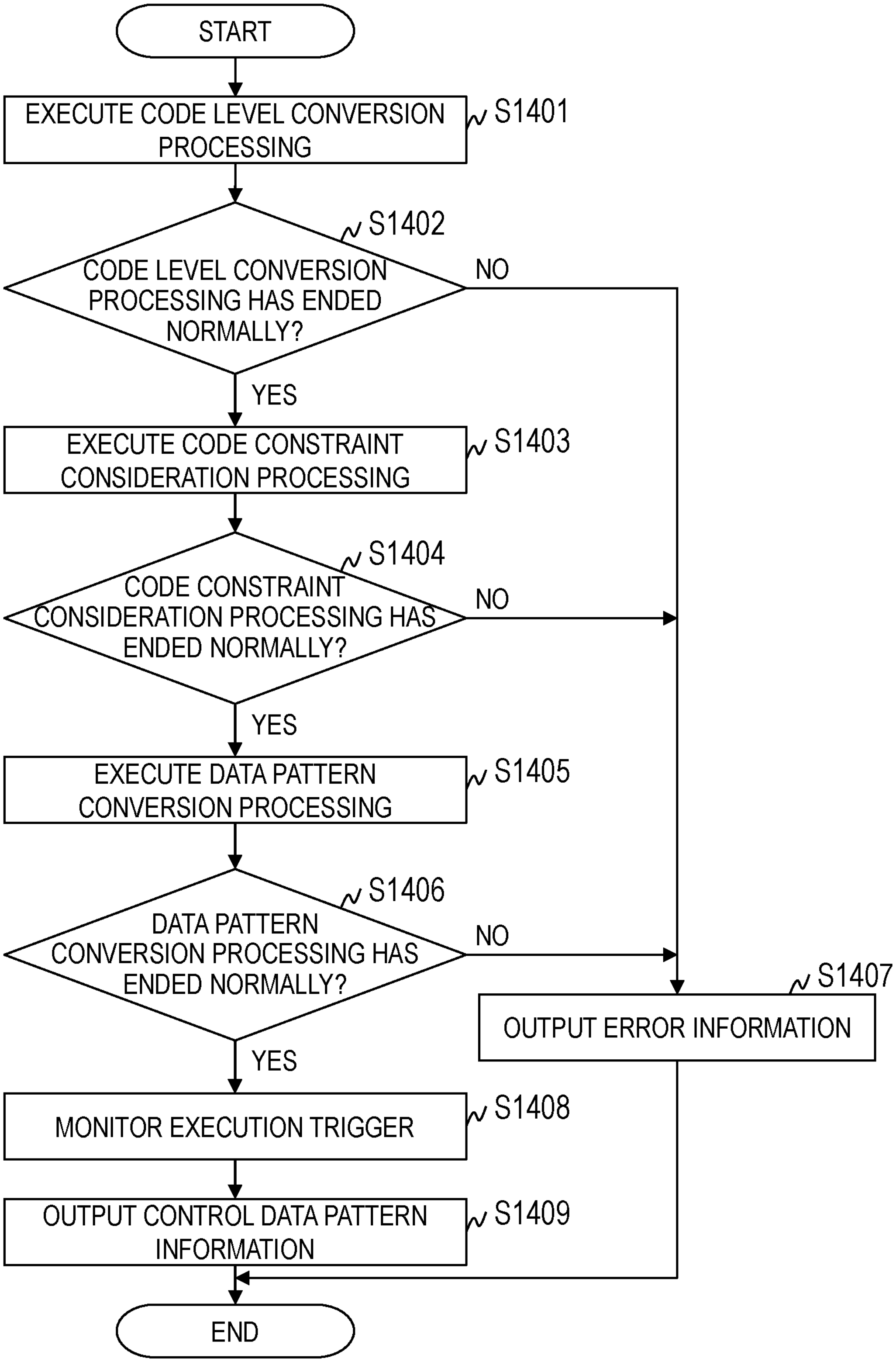
FIG. 14 is a flowchart for illustrating an example of an overview of processing to be executed by a control data pattern generation module in the first embodiment.
Figure 17:
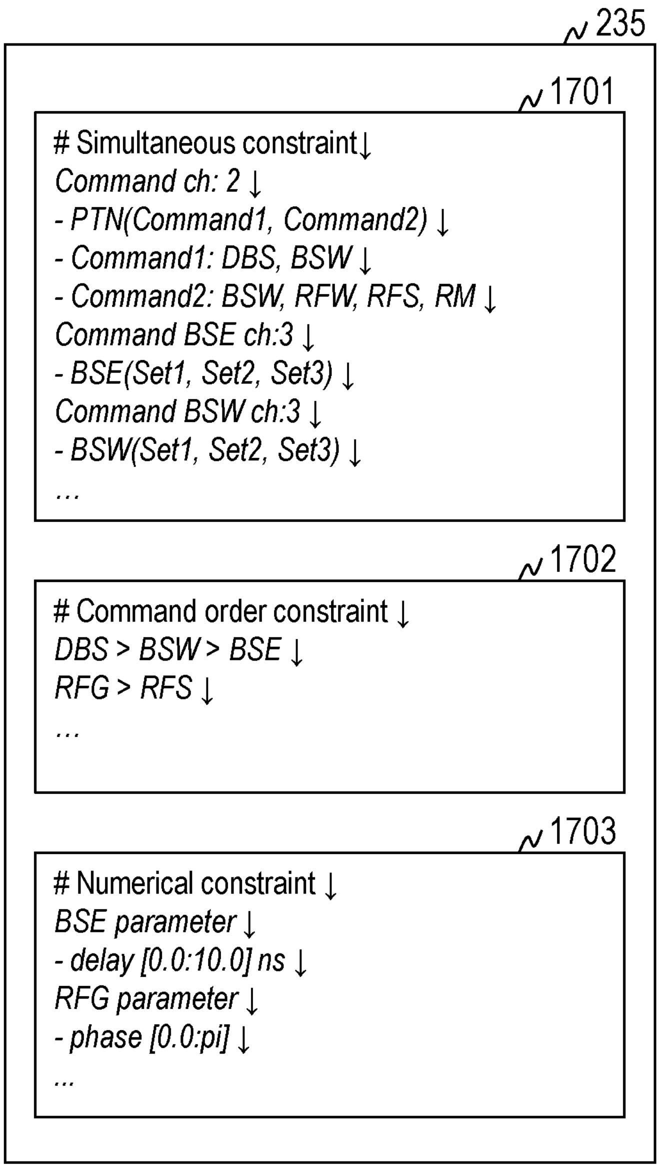
FIG. 17 is a diagram for illustrating an example of constraint information in the first embodiment.
Figure 19:
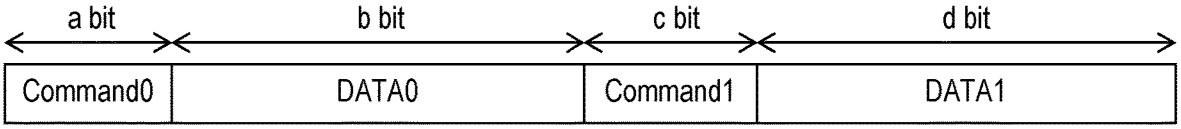
FIG. 19 is a diagram for illustrating an example of a format of control data in the first embodiment.
Figure 20:
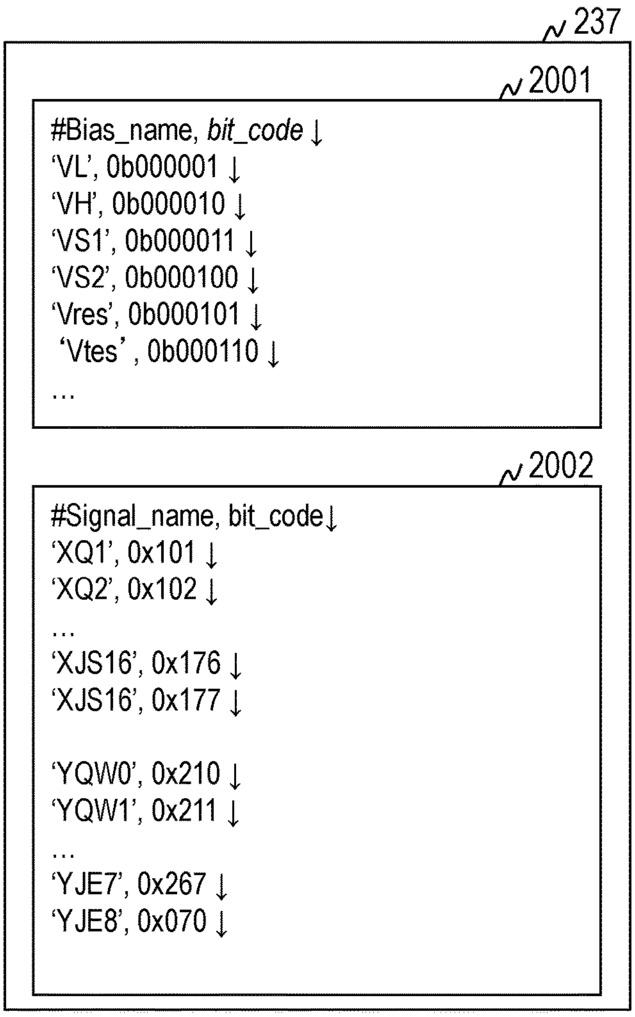
FIG. 20 is a diagram for illustrating an example of bit correspondence information in the first embodiment.

FIG. 13 is a diagram for illustrating a functional configuration relating to the control unit level, the constraint consideration level, and the data pattern conversion level of the control system 11 of the first embodiment. FIG. 14 is a flowchart for illustrating an example of an overview of processing to be executed by the control data pattern generation module 216 in the first embodiment. FIG. 15 is a diagram for illustrating an example of the execution command information 234 in the first embodiment. FIG. 16 is a diagram for illustrating an example of the control unit level code in the first embodiment. FIG. 17 is a diagram for illustrating an example of the constraint information 235 in the first embodiment. FIG. 18 is a diagram for illustrating an example of the constraint consideration control unit level code in the first embodiment. FIG. 19 is a diagram for illustrating an example of a format of the control data in the first embodiment. FIG. 20 is a diagram for illustrating an example of the bit correspondence information 237 in the first embodiment. FIG. 21 is a diagram for illustrating an example of the control data pattern information in the first embodiment.

The control data pattern generation module 216 includes a code level conversion module 1301 which executes the control unit level, a code constraint consideration module 1302 which executes the constraint consideration level, and a data pattern conversion module 1303 which executes the data pattern conversion level.

The control data pattern generation module 216 starts processing of generating the control data pattern 251 in a case where the control flow data (code description) 230 is received and the execution trigger is detected. The execution trigger is received from the user program 241 via the API 220. The function of receiving the execution trigger may be implemented in the GUI 210.

The code level conversion module 1301 executes code level conversion processing for generating the control unit level code 1310 from the control flow data (code description) 230 in a case where the control flow data (code description) 230 is received and the execution trigger is detected (Step S1401).

(Step S1401-1)

The code level conversion module 1301 refers to the signal information 232 and the bias voltage information 233 to determine whether or not there is an error in, for example, the signal name or the bias voltage name. In a case where there is an error, the code level conversion module 1301 generates error information, and ends the code level conversion processing.

(Step S1401-2)

In a case where there is no error, the code level conversion module 1301 generates the control unit level code 1310 like that illustrated in FIG. 16 by breaking up the control flow data (code description) 230 into commands having granularities executable by the analog control unit 102 based on the correspondence between the control flow data (code description) 230 and the execution command of the analog control unit 102 defined in the execution command information 234 like that illustrated in FIG. 15. For example, biasing of the control flow data (code description) 230 is broken up into DBS and BSE for the control unit level code, and RF signal application is broken up into RFW and RFS.

The code level conversion module 1301 determines whether or not the code level conversion processing has ended normally (Step S1402).

In a case where the code level conversion processing has not ended normally, the code level conversion module 1301 outputs error information (Step S1407), and ends the overall processing.

In a case where the code level conversion processing has ended normally, the code level conversion module 1301 outputs the control unit level code 1310 to the code constraint consideration module 1302.

In a case where the code constraint consideration module 1302 receives the control unit level code 1310 and detects the execution trigger, the code constraint consideration module 1302 executes code constraint consideration processing for generating the constraint consideration control unit level code 1311 from the control unit level code 1310 (Step S1403).

In the code constraint consideration processing, constraint information 235 like that illustrated in FIG. 17 is used. The constraint information 235 includes simultaneous constraint information 1701, command order constraint information 1702, and numerical constraint information 1703.

The simultaneous constraint information 1701 defines constraints relating to the control commands which are simultaneously executable. In the analog control unit 102, in a case where there are control commands which can be executed simultaneously, or in a case where there are control commands for which a plurality of settings can be set simultaneously, the code constraint consideration module 1302 optimizes the control commands included in the control unit level code 1310.

The command order constraint information 1702 defines constraints relating to the execution order of the control commands. In order to apply a device voltage to the quantum bit device 103, it is required that the analog control unit 102 execute the control commands in a predetermined order. For example, DBS, BSW, and BSE for the signals are dependent in order.

The numerical constraint information 1703 defines constraints relating to the value ranges of the setting parameters. It is required that the values of the setting parameters be set within those value ranges.

(Step S1403-1)

For example, the code constraint consideration module 1302 determines whether or not the control unit level code 1310 satisfies the numerical constraint information 1703. In a case where the numerical constraint information 1703 is not satisfied, the code constraint consideration module 1302 generates error information, and ends the code constraint consideration processing.

(Step S1403-2)

In a case where the numerical constraint information 1703 is satisfied, the code constraint consideration module 1302 generates the constraint consideration control unit level code 1311 like that illustrated in FIG. 18 by optimizing the control unit level code 1310 based on the simultaneous constraint information 1701 and the command order constraint information 1702.

The code constraint consideration module 1302 determines whether or not the code constraint consideration processing has ended normally (Step S1404).

In a case where the code constraint consideration processing has not ended normally, the code constraint consideration module 1302 outputs error information (Step S1407), and ends the overall processing.

In a case where the code constraint consideration processing has ended normally, the code constraint consideration module 1302 outputs the constraint consideration control unit level code 1311 to the data pattern conversion module 1303.

In a case where the data pattern conversion module 1303 receives the constraint consideration control unit level code 1311 and detects the execution trigger, the data pattern conversion module 1303 executes data pattern conversion processing for generating the control data pattern 251 from the constraint consideration control unit level code 1311 (Step S1405).

In the data pattern conversion processing, the format information 236 defining the format of the control data pattern like that illustrated in FIG. 19 and the bit correspondence information 237 like that illustrated in FIG. 20 are used. The format information 236 is information which defines the bit fields of the control data pattern 251. The bit correspondence information 237 is, for example, information which defines correspondences (reference numerals 2001 and 2002) between bias voltage names or signal names, for example, and bit expressions.

The data pattern conversion module 1303 converts, for example, the control commands and the setting data included in the constraint consideration control unit level code 1311 into bit strings in accordance with the bit fields defined by the format information 236. At this time, the data pattern conversion module 1303 refers to the bit correspondence information 237, and adds the setting data corresponding to the signal name. As a result, the control data pattern information 1312 like that illustrated in FIG. 21 is generated. One row corresponds to one control data pattern 251.

The data pattern conversion module 1303 determines whether or not the data pattern conversion processing has ended normally (Step S1406).

In a case where the data pattern conversion processing has not ended normally, the data pattern conversion module 1303 outputs error information (Step S1407), and ends the overall processing.

In a case where the data pattern conversion processing has ended normally, the data pattern conversion module 1303 monitors the execution trigger of the execution control level (Step S1408).

In a case where the execution trigger of the execution control level is detected, the data pattern conversion module 1303 outputs the control data pattern information 1312 to the control module 217 (Step S1409), and ends the overall processing.

Figure 22:
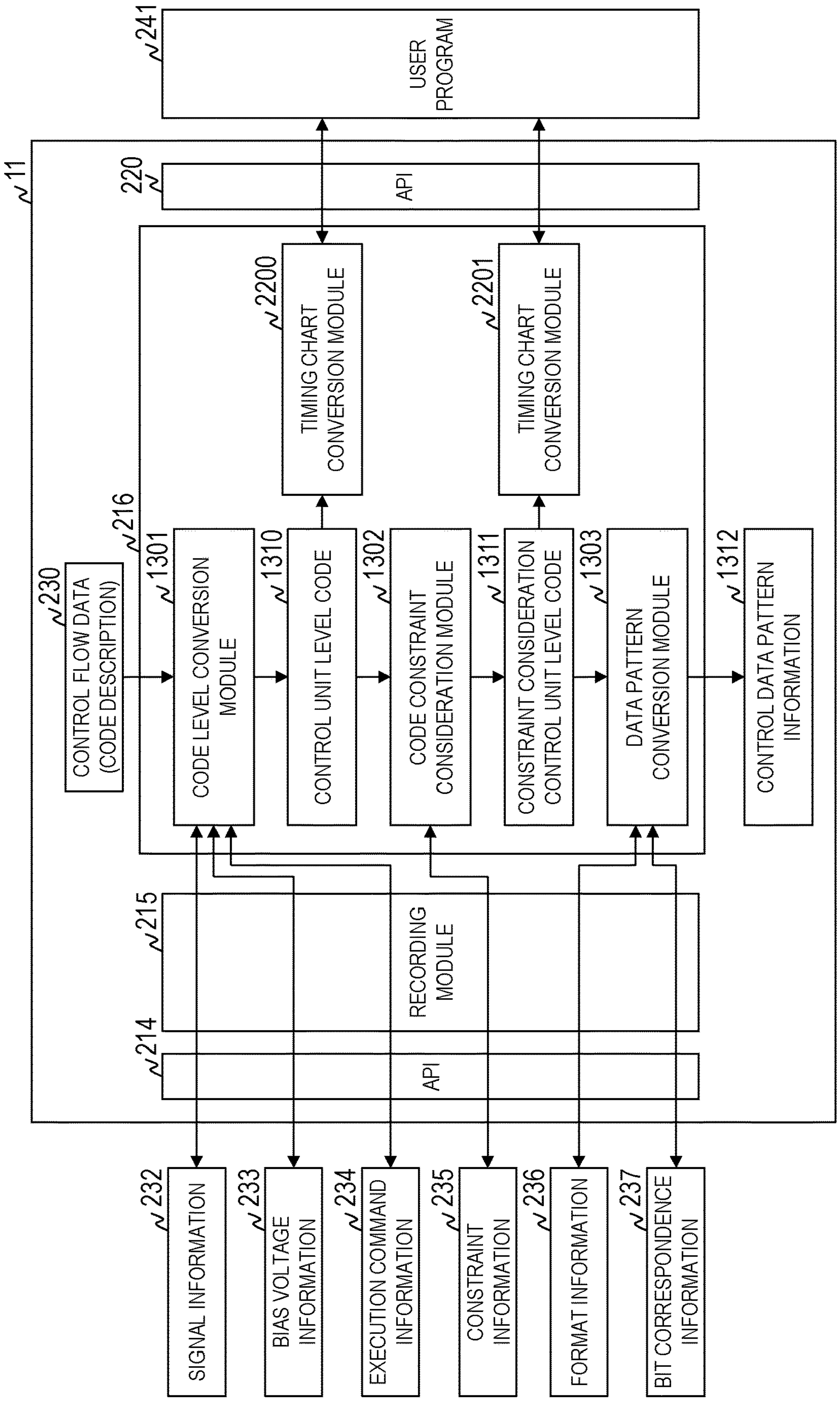
FIG. 22 is a diagram for illustrating a modification example of the functional configuration of the control data pattern generation module in the first embodiment.

FIG. 22 is a diagram for illustrating a modification example of the functional configuration of the control data pattern generation module 216 in the first embodiment.

The control data pattern generation module 216 may include two timing chart conversion modules 2200 and 2201. The timing chart conversion module 2200 converts the processing result of the control unit level into a timing chart, and presents the timing chart to the user. The timing chart conversion module 2201 converts the processing result of the constraint consideration level into a timing chart, and presents the timing chart to the user.

The control data pattern generation module 216 may also directly output the processing result of each processing level, for example, via the API 220.

The user can cause feedback to be reflected in various types of information, for example, the signal information 232, by analyzing the output processing results, for example.

The control system 11 can convert the control flow data (code description) 230 into commands having granularities executable by the analog control unit 102. Further, the control system 11 can optimize the control flow data (code description) 230 by taking into consideration the constraints relating to the control of the analog control unit 102. The control system 11 can also convert control flow data (code description) 230 into a control data pattern 251.

The knowledge of the different layers, such as the signal information, the parameter settings, and the control constraints, can be set individually via the API 214. This enables the quantum bit device 103 to be controlled even by a user who does not have knowledge of the various layers.

(Execution Control Level)

Figure 23:
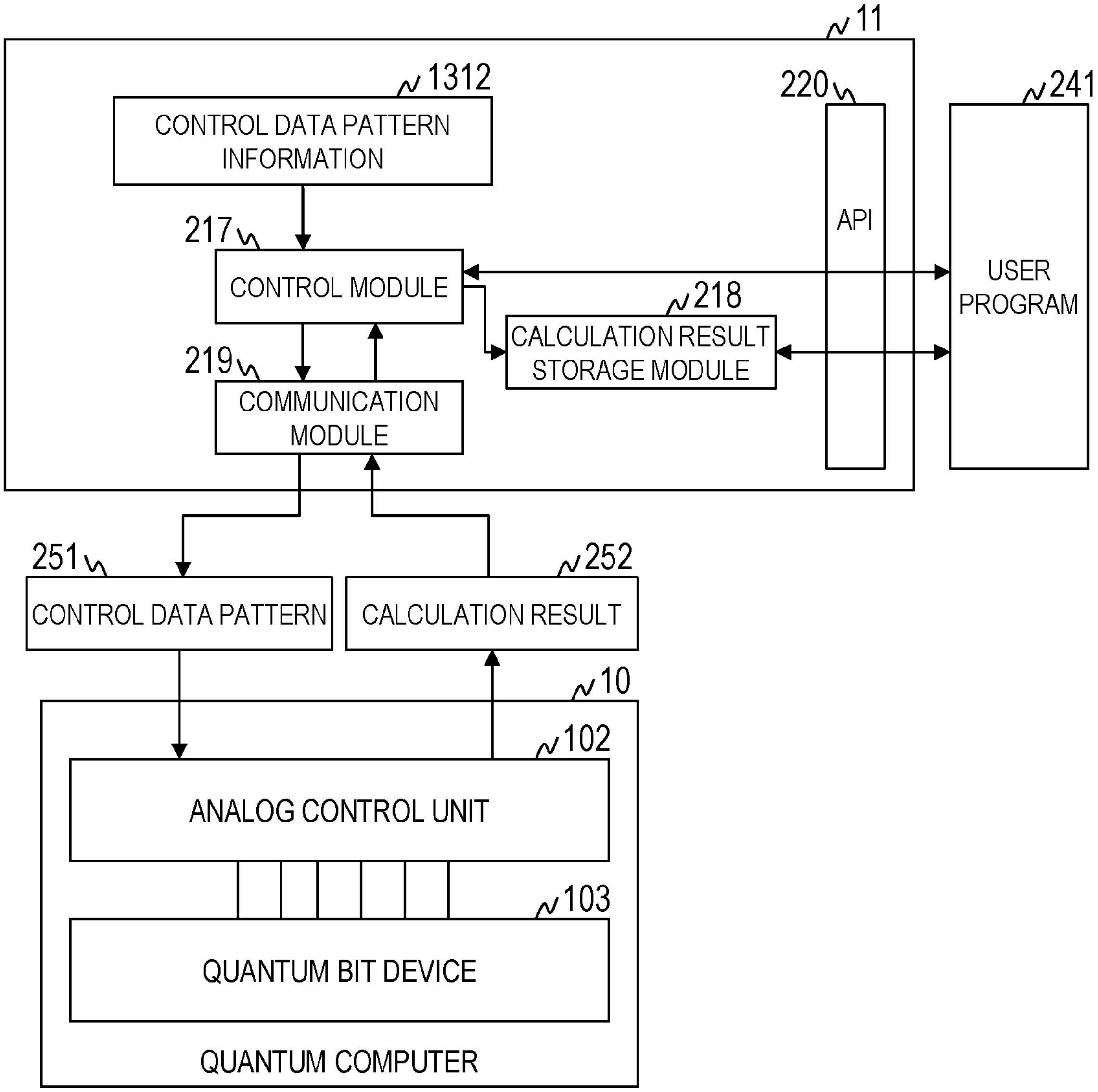
FIG. 23 is a diagram for illustrating a functional configuration relating to an execution control level of the control system of the first embodiment.
Figure 24:
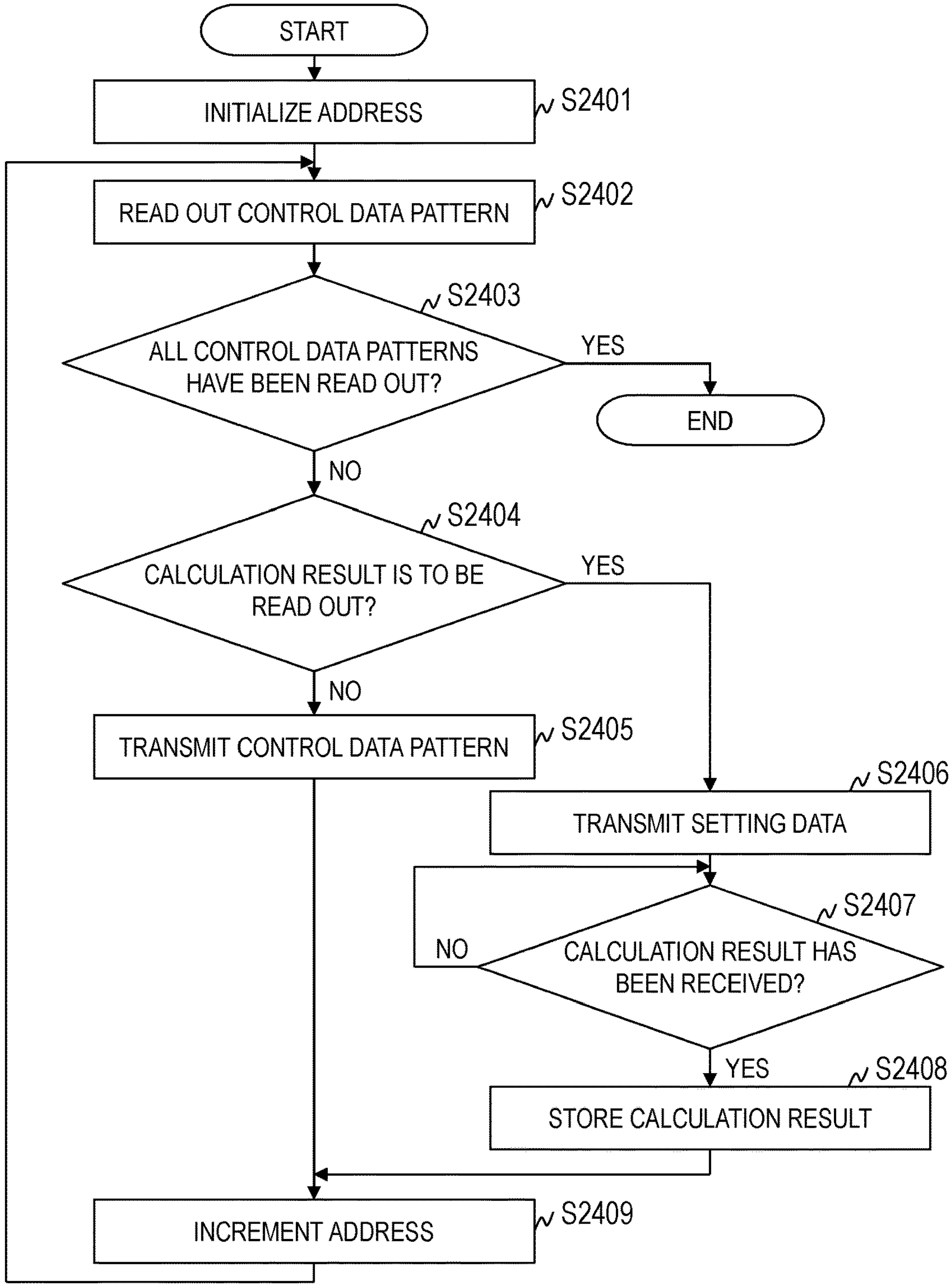
FIG. 24 is a flowchart for illustrating an example of the execution control level to be executed by the control system of the first embodiment.
Figure 25:
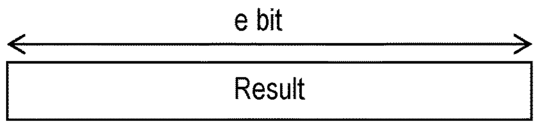
FIG. 25 is a diagram for illustrating an example of a data format of a calculation result in the first embodiment.

FIG. 23 is a diagram for illustrating a functional configuration relating to the execution control level of the control system 11 of the first embodiment. FIG. 24 is a flowchart for illustrating an example of the execution control level to be executed by the control system 11 of the first embodiment. FIG. 25 is a diagram for illustrating an example of a data format of the calculation result 252 in the first embodiment.

The execution trigger is received from the user program 241 via the API 220. The function of receiving the execution trigger may be implemented in the GUI 210.

In a case where the control module 217 receives the control data pattern information 1312 and detects the execution trigger, the control module 217 initializes the address (Step S2401).

The control module 217 reads out the control data pattern 251 corresponding to the address from the control data pattern information 1312 (Step S2402).

The control module 217 determines whether or not reading out of all the control data patterns 251 is complete (Step S2403). Specifically, the control module 217 determines whether or not the control data pattern 251 corresponding to the address exists. In a case where the control data pattern 251 corresponding to the address does not exist, the control module 217 determines that reading out of all the control data patterns 251 is complete.

In a case where reading out of all the control data patterns 251 is complete, the control module 217 ends the execution control level.

In a case where reading out of all the control data patterns 251 is not complete, the control module 217 determines whether or not each read control data pattern 251 is a control data pattern instructing obtaining of the calculation result 252 (Step S2404).

In a case where a read control data pattern 251 is not a control data pattern instructing obtaining of the calculation result 252, the control module 217 instructs the communication module 219 to transmit the read control data pattern 251 (Step S2405). In a case where the communication module 219 receives the instruction, the communication module 219 transmits the control data pattern 251 to the analog control unit 102.

The analog control unit 102 stores the received control data pattern 251 in memory, and detects the storage of the control data pattern 251 as an execution trigger. The analog control unit 102 generates a control signal based on the control data pattern 251, and uses the generated control signal to control the quantum bit device 103.

The control module 217 increments the address (Step S2409), and then returns the process to Step S2402.

In a case where the read control data pattern 251 is a control data pattern instructing obtaining of the calculation result 252, the control module 217 instructs the communication module 219 to transmit setting data for reading the calculation result 252 (Step S2406), and transitions to a standby state. The communication module 219 transmits the setting data for reading the calculation result 252 to the analog control unit 102.

The analog control unit 102 generates the calculation result 252 having a data format like that illustrated in FIG. 25 based on the setting data, and transmits the generated calculation result 252 to the control system 11.

The control module 217 determines whether or not a calculation result has been received (Step S2407).

In a case where a calculation result has not been received, the control module 217 returns the process to Step S2407 after a certain period of time has passed.

In a case where a calculation result has been received, the control module 217 stores the calculation result 252 in the calculation result storage module 218 (Step S2408), increments the address (Step S2409), and then returns the process to Step S2402.

The calculation result storage module 218 can output the calculation result 252 to the user program 241 via the API 220.

As described above, in the development and the verification of a large-scale quantum computer, the control system 11 of the first embodiment can control the quantum bit device 103 even when the user does not have knowledge of the various layers, such as the quantum bit device 103 and system control.

The present invention is not limited to the above embodiment and includes various modification examples. In addition, for example, the configurations of the above embodiment are described in detail so as to describe the present invention comprehensibly. The present invention is not necessarily limited to the embodiment that is provided with all of the configurations described. In addition, a part of each configuration of the embodiment may be removed, substituted, or added to other configurations.

A part or the entirety of each of the above configurations, functions, processing units, processing means, and the like may be realized by hardware, such as by designing integrated circuits therefor. In addition, the present invention can be realized by program codes of software that realizes the functions of the embodiment. In this case, a storage medium on which the program codes are recorded is provided to a computer, and a CPU that the computer is provided with reads the program codes stored on the storage medium. In this case, the program codes read from the storage medium realize the functions of the above embodiment, and the program codes and the storage medium storing the program codes constitute the present invention. Examples of such a storage medium used for supplying program codes include a flexible disk, a CD-ROM, a DVD-ROM, a hard disk, a solid state drive (SSD), an optical disc, a magneto-optical disc, a CD-ft a magnetic tape, a non-volatile memory card, and a ROM.

The program codes that realize the functions written in the present embodiment can be implemented by a wide range of programming and scripting languages such as assembler, C/C++, Perl, shell scripts, PHP, Python and Java.

It may also be possible that the program codes of the software that realizes the functions of the embodiment are stored on storing means such as a hard disk or a memory of the computer or on a storage medium such as a CD-RW or a CD-R by distributing the program codes through a network and that the CPU that the computer is provided with reads and executes the program codes stored on the storing means or on the storage medium.

In the above embodiment, only control lines and information lines that are considered as necessary for description are illustrated, and all the control lines and information lines of a product are not necessarily illustrated. All of the configurations of the embodiment may be connected to each other.

What is claimed is:

1. A control system for controlling a quantum computer, the control system comprising a computer including a processor, a memory coupled to the processor, and a network interface coupled to the processor, the control system being coupled to an analog control unit configured to generate a control signal for controlling a quantum bit device including a plurality of quantum bits, the control system being configured to hold first setting information relating to a setting parameter for controlling the quantum bit device, second setting information relating to control of the analog control unit, and third setting information relating to a format of a control data pattern for generating the control signal, the processor being configured to:

convert, based on the first setting information and the second setting information, first control flow data which is described in a code format and defines control details of the quantum bit device into second control flow data which defines the control details of the quantum bit device by the analog control unit; and generate a plurality of the control data patterns from the second control flow data based on the third setting information, wherein the first setting information includes signal information defining a setting parameter of a signal in the quantum bit device and bias voltage information defining a setting parameter of a bias voltage in the quantum bit device, wherein the second setting information includes execution command information defining a command to be executed by the analog control unit and constraint information defining a constraint on control of the analog control unit, and wherein the processor is configured to:

convert, based on the signal information, the bias voltage information, and the execution command information, the first control flow data into first intermediate control flow data including a group of commands having granularities executable by the analog control unit; and convert, based on the constraint information, the first intermediate control flow data into the second control flow data which satisfies the constraint of the analog control unit and includes an optimized command group.

2. The control system according to claim 1, wherein the processor is configured to:

receive third control flow data which is described in a waveform format from which the control details are visually graspable by a user and which defines the control details of the quantum bit device; and convert the third control flow data into the first control flow data.

3. The control system according to claim 2, wherein the processor is configured to:

receive the first control flow data; and convert the first control flow data into the third control flow data, and output the third control flow data.

4. The control system according to claim 1, wherein the processor is configured to output the first intermediate control flow data and the second control flow data.

5. The control system according to claim 1, wherein the processor is configured to convert the first intermediate control flow data and the second control flow data into a timing chart, and to output the timing chart.

6. The control system according to claim 1, wherein the processor is configured to:

transmit the plurality of the control data patterns to the analog control unit; and obtain a calculation result of the quantum bit device from the analog control unit.

7. The control system according to claim 1, wherein the processor is configured to present an interface for setting the first setting information, the second setting information, and the third setting information.

8. A quantum computer control method, which is executed by a control system, the control system including a computer including a processor, a memory coupled to the processor, and a network interface coupled to the processor, the control system being coupled to an analog control unit configured to generate a control signal for controlling a quantum bit device including a plurality of quantum bits, the control system being configured to hold first setting information relating to a setting parameter for controlling the quantum bit device, second setting information relating to control of the analog control unit, and third setting information relating to a format of a control data pattern for generating the control signal, the quantum computer control method including:

a first step of converting, by the processor, based on the first setting information and the second setting information, first control flow data which is described in a code format and defines control details of the quantum bit device into second control flow data which defines the control details of the quantum bit device by the analog control unit; and a second step of generating, by the processor, a plurality of the control data patterns from the second control flow data based on the third setting information, wherein the first setting information includes signal information defining a setting parameter of a signal in the quantum bit device and bias voltage information defining a setting parameter of a bias voltage in the quantum bit device, wherein the second setting information includes execution command information defining a command to be executed by the analog control unit and constraint information defining a constraint on control of the analog control unit, and wherein the first step includes:

converting, by the processor, based on the signal information, the bias voltage information, and the execution command information, the first control flow data into first intermediate control flow data including a group of commands having granularities executable by the analog control unit; and converting, by the processor, based on the constraint information, the first intermediate control flow data into the second control flow data which satisfies the constraint of the analog control unit and includes an optimized command group.

9. The quantum computer control method according to claim 8, wherein the first step includes:

receiving, by the processor, third control flow data which is described in a waveform format from which the control details are visually graspable by a user and which defines the control details of the quantum bit device; and converting, by the processor, the third control flow data into the first control flow data.

10. The quantum computer control method according to claim 9, further including:

receiving, by the processor, the first control flow data; and converting, by the processor, the first control flow data into the third control flow data, and outputting the third control flow data.

11. The quantum computer control method according to claim 8, further including outputting, by the processor, the first intermediate control flow data and the second control flow data.

12. The quantum computer control method according to claim 8, further including converting, by the processor, the first intermediate control flow data and the second control flow data into a timing chart, and outputting the timing chart.

13. The quantum computer control method according to claim 8, further including:

transmitting, by the processor, the plurality of the control data patterns to the analog control unit; and obtaining, by the processor, a calculation result of the quantum bit device from the analog control unit.

* * * * *